United States Patent
Mawatari et al.

(10) Patent No.: US 6,743,849 B2
(45) Date of Patent: Jun. 1, 2004

(54) THERMOPLASTIC RESIN COMPOSITION

(75) Inventors: Masaaki Mawatari, Chuo-ku (JP); Kenji Mitamura, Chuo-ku (JP)

(73) Assignee: DSM JSR Engineering Plastics Kabushiki Kaisha, Tokyo (JP)

( * ) Notice: Subject to any disclaimer, the term of this patent is extended or adjusted under 35 U.S.C. 154(b) by 186 days.

(21) Appl. No.: 09/886,256

(22) Filed: Jun. 22, 2001

(65) Prior Publication Data

US 2002/0019497 A1 Feb. 14, 2002

(30) Foreign Application Priority Data

Jul. 6, 2000 (JP) .................................. 2000-204512

(51) Int. Cl.⁷ .............................................. C08L 77/00
(52) U.S. Cl. ...................................... 524/538; 525/432
(58) Field of Search ............................ 525/432; 524/538

(56) References Cited

U.S. PATENT DOCUMENTS

| 4,716,214 A | 12/1987 | Gaymans et al. | |
| 5,143,983 A | * 9/1992 | Yamagishi et al. | ......... 525/432 |

FOREIGN PATENT DOCUMENTS

| EP | 0 388 942 | 9/1990 |
| EP | 0 976 774 | 2/2000 |
| JP | 7-228773 | 8/1995 |
| JP | 7-228775 | 8/1995 |
| JP | 11-241019 | 9/1999 |
| JP | 11-241020 | 9/1999 |

OTHER PUBLICATIONS

Patent Abstracts of Japan, JP 09–012875, Jan. 14, 1997.
Derwent Publications, AN 2000–298678/26, JP 2000–086887, Mar. 28, 2000.
Patent Abstracts of Japan, JP 61–188459, Aug. 22, 1986.
Derwent Publications, AN 94–115362/14, JP 06–065502, Mar. 8, 1994.
Patent Abstracts of Japan, JP 3–273058, Dec. 4, 1991.
Derwent Publications, AN 92–027488/04, JP 3–273058, Dec. 4, 1991.

* cited by examiner

*Primary Examiner*—Ana Woodward
(74) *Attorney, Agent, or Firm*—Oblon, Spivak, McClelland, Maier & Neustadt, P.C.

(57) ABSTRACT

The invention provides a thermoplastic resin composition having excellent blister resistance, which does not cause blister on the surfaces of resinous parts by passing through a reflowing oven when the resin composition is used as a resin material forming the resinous parts subjected to the surface-mount technology system, particularly, a thermoplastic resin composition high in mechanical strength such as flexural strength, weld strength and tensile elongation and excellent in moldability and friction property. The resin composition contains a polyamide resin component composed of 5 to 95% by weight of the following component (A) and 95 to 5% by weight of the following component (B):

Component (A): a polyamide resin obtained by polycondensing diamine(s) including at least tetramethylenediamine with dicarboxylic acid(s) including at least adipic acid; and Component (B): a polyamide resin obtained by polycondensing diamine(s) including at least one of 1,9-nonanediamine and 2-methyl-1,8-octanediamine with dicarboxylic acid(s) including at least terephthalic acid.

20 Claims, No Drawings

THERMOPLASTIC RESIN COMPOSITION

BACKGROUND OF THE INVENTION

1. Field of the Invention

The present invention relates to a thermoplastic resin composition high in mechanical strength, excellent in moldability and friction property (sliding wear resistance) and moreover high in anti-blister property at a high temperature, for example, in the case where soldering is conducted in a reflowing oven.

2. Description of the Background Art

Polyamide 4,6 (nylon 4,6) resins are high in mechanical strength such as modulus in flexure and tensile elongation and excellent in thermal properties such as heat resistance, electrical properties, friction property and molding and processing ability and are hence utilized in wide fields such as electric and electronic parts, vehicle parts, various instruments, and sundries.

With the miniaturization of products and the improvement in productivity in recent years, the field of electric and electronic industries have come to adopt a method of soldering resinous electronic parts having resin-made parts such as connectors, switches, relays and coil bobbins to a printed board by a surface-mount technology system.

The term "surface-mount technology system" as used herein means a mounting system that electronic parts are placed on a printed wiring board through a creamy solder, and the wiring board is then passed through a heating oven (reflowing oven), thereby melting the solder to fix the electronic parts to the wiring board. This surface-mount technology system is different from the conventional insertion-mount system (lead-through system) that lead wires of electronic parts are inserted into through-holes in a wiring board, and soldering (free soldering or wave soldering) is directly conducted on a surface opposite to a surface on which the electronic parts are to be mounted.

This surface-mount technology system has such merits that mount density can be heightened, mounting can be conducted on both surfaces of a board, and production cost can be reduced by high efficiency and is becoming the mainstream of the mount system by soldering.

When electronic parts composed of the conventionally known resin materials including polyamide 4,6 resins are fixed (soldered) to a wiring board by means of the surface-mount technology system, however, such a system involves a problem that blister occurs on the surfaces of the electronic parts when the wiring board, on which the electronic parts have been placed, passes through a reflowing oven, and the commercial value of the resulting product is markedly reduced.

In addition, there is a tendency for frequency of occurrence of blister to increase with the increased oven temperature (set temperature) required for use of a lead free solder which is favorable from the viewpoint of environmental protection and the like.

Therefore, it is desired to develop a resin composition, which is excellent in anti-blister property when soldering is conducted in a reflowing oven, as a resin material forming resinous electronic parts subjected to the surface-mount technology system.

On the other hand, polyamide resins (hereinafter may also be referred to as "polyamide 9, T resins) obtained by polycondensing 1,9-nonanediamine and terephthalic acid have high mechanical strength (tensile strength and flexural strength) and good heat resistance, and are hence considered to be capable of developing good anti-blister property and expected to be developed into use for the surface-mount technology system.

However, the polyamide 9, T resins are poor in moldability, and so it is difficult to produce thin-wall moldings and the like therefrom. In addition, the polyamide 9, T resins involve a problem that the tensile elongation and the strength of a weld part are poor, and moreover the friction property is also poor.

SUMMARY OF THE INVENTION

The present invention has been made on the basis of the foregoing circumstances.

It is the first object of the present invention to provide a thermoplastic resin composition having excellent anti-blister property, which does not cause blister on the surfaces of resinous parts by passing through a reflowing oven when the resin composition is used as a resin material forming the resinous parts subjected to the surface-mount technology system.

A second object of the present invention is to provide a thermoplastic resin composition high in mechanical strength such as flexural strength, weld strength and tensile elongation and excellent in moldability and friction property.

The present inventors have carried out an extensive investigation with a view toward achieving the above objects. As a result, it has been found that a polyamide 4,6 resin and a polyamide 9, T resin are blended with each other in respective specific proportions, thereby providing a thermoplastic resin composition high in mechanical strength (flexural strength, weld strength and tensile elongation) and excellent in moldability, friction property and anti-blister property. The present invention has been led to completion on the basis of such a finding.

In particular, it has been surprising that the modulus in flexure of the thermoplastic resin composition according to the present invention becomes higher than a value calculated from the blending ratio of the polyamide 4,6 resin to the polyamide 9, T resin.

According to the present invention, there is thus provided a thermoplastic resin composition comprising a polyamide resin component (hereinafter may also be referred to as "specific polyamide resin component") composed of 5 to 95% by weight of the following component (A) and 95 to 5% by weight of the following component (B):

Component (A): a polyamide resin obtained by polycondensing diamine(s) including at least tetramethylenediamine with dicarboxylic acid(s) including at least adipic acid; and Component (B): a polyamide resin obtained by polycondensing diamine(s) including at least one of 1,9-nonanediamine and 2-methyl-1,8-octanediamine with dicarboxylic acid(s) including at least terephthalic acid.

In the thermoplastic resin composition according to the present invention, the specific polyamide resin component may preferably be composed of 55 to 80% by weight of the component (A) and 45 to 20% by weight of the component (B).

In the thermoplastic resin composition according to the present invention, the component (A) may preferably be composed of a polyamide 4,6 resin obtained from tetramethylenediamine and adipic acid.

In the thermoplastic resin composition according to the present invention, the component (B) may be preferably be composed of a polyamide resin obtained from 1,9-nonanediamine and/or 2-methyl-1,8-octanediamine, and terephthalic acid.

The thermoplastic resin composition according to the present invention may preferably comprise, per 100 parts by weight of the specific polyamide resin component, 5 to 70 parts by weight of (C) a flame retardant (hereinafter may also be referred to as "component (C)") and 0 to 50 parts by weight of (D) a flame-retardant aid (hereinafter may also be referred to as "component (D)").

The thermoplastic resin composition according to the present invention may preferably comprise, per 100 parts by weight of the specific polyamide resin component, 5 to 300 parts by weight of (E) an inorganic filler (hereinafter may also be referred to as "component (E)").

DETAILED DESCRIPTION OF THE PREFERRED EMBODIMENTS

The thermoplastic resin compositions according to the present invention will hereinafter be described in detail.

Component (A)

The component (A) constituting the thermoplastic resin composition according to the present invention is a polyamide resin obtained by polycondensing diamine(s) including at least tetramethylenediamine with dicarboxylic acid(s) including at least adipic acid and includes (i) "a polyamide 4,6 resin" obtained by polycondensing tetramethylenediamine with adipic acid and (ii) "a copolyamide" comprising a polytetramethylene adipamide unit as a main constitutive component.

No particular limitation is imposed on the preparation process of the component (A). As examples thereof, may be mentioned the processes described in Japanese Patent Application Laid-Open Nos. 149430/1981, 149431/1981, 83029/1983 and 43631/1986.

No particular limitation is also imposed on the degree of polymerization of the component (A). However, the degree of polymerization is preferably such that the relative viscosity of the component (A) amounts to a range of 2.0 to 6.0 at a polymer concentration of 1 g/dl in 96% sulfuric acid at 25° C.

As examples of "other diamines than tetramethylenediamine", which may be used for obtaining the component (A), may be mentioned hexamethylenediamine, undecamethylenediamine, dodecamethylenediamine, 2,2,4-trimethylhexamethylenediamine, 2,4,4-trimethylhexamethylenediamine, 5-methylnonamethylenediamine, m-xylylenediamine, p-xylylenediamine, 1,3-bis (aminomethyl)-cyclohexane, 1-amino-3-aminomethyl-3,5,5-trimethylcyclo-hexane, bis(3-methyl-4-aminocyclohexyl) methane, 2,2-bis(4-aminocyclohexyl)propane, 2,2-bis (aminopropyl)piperazine, aminoethylpiperazine, ethylenediamine, propylenediamine and 1,8-octanediamine. These diamines may be used either singly or in any combination thereof in combination with tetramethylenediamine.

Among the diamines used for obtaining the component (A), the proportion of tetramethylenediamine is generally at least 50% by mole, preferably 70 to 100% by mole, more preferably 100% by mole.

As examples of "other dicarboxylic acids than adipic acid", which may be used for obtaining the component (A), may be mentioned aliphatic dicarboxylic acids such as malonic acid, dimethylmalonic acid, succinic acid, 3,3-diethylsuccinic acid, glutaric acid, 2,2-dimethylglutaric acid, 2-methyladipic acid, trimethyladipic acid, pimelic acid, azelaic acid, sebacic acid and suberic acid; alicyclic dicarboxylic acids such as 1,3-cyclopentane-dicarboxylic acid and 1,4-cyclohexanedicarboxylic acid; and aromatic dicarboxylic acids such as terephthalic acid, isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylene-dioxydiacetic acid, diphenic acid, 4,4'-oxydibenzoic acid, diphenylmethane-4,4'-dicarboxylic acid, diphenyl-sulfone-4,4'-dicarboxylic acid and 4,4'-biphenyl-dicarboxylic acid. These dicarboxylic acids may be used either singly or in any combination thereof in combination with adipic acid.

Among the dicarboxylic acids used for obtaining the component (A), the proportion of adipic acid is generally at least 50% by mole, preferably 70 to 100% by mole, more preferably 100% by mole.

A polycarboxylic acid having at least 3 functional groups, such as trimellitic acid, trimesic acid or pyromellitic acid, may be mixed into the reaction system for obtaining the component (A) to introduce units derived from these polycarboxylic acids into the component (A).

The amount of such a polycarboxylic acid used is within a range in which moldability by melt molding of the finally obtained resin composition is not impaired.

Component (B)

The component (B) constituting the thermoplastic resin composition according to the present invention is a polyamide resin obtained by polycondensing diamine(s) including at least one of 1,9-nonanediamine and 2-methyl-1,8-octanediamine with dicarboxylic acid(s) including at least terephthalic acid.

As examples of the preparation process of the component (B), may be mentioned the conventionally known polymerization processes for preparing polyamide, i.e., a melt polymerization process, a solution polymerization process, a polymerization process making use of a reaction type extruder, etc.

Specifically, the polyamide serving as the component (B) can be easily obtained by adding a catalyst and optionally a terminal capping agent at once to a reaction system containing diamine(s) including at least one of 1,9-nonanediamine and 2-methyl-1,8-octanediamine, and dicarboxylic acid(s) including at least terephthalic acid to prepare a nylon salt, preparing a prepolymer having an intrinsic viscosity [η] of 0.10 to 0.60 dl/g at 30° C. in concentrated sulfuric acid once at a temperature not higher than 280° C., and then conducting post polymerization of this prepolymer. As examples of a means for the post polymerization, may be mentioned solid-state polymerization and polymerization making use of a melt extruder.

The intrinsic viscosity [η] of the prepolymer is controlled within a range of 0.10 to 0.60 dl/g, thereby preventing deviation of mole balance between carboxyl groups and amino groups and lowering of polymerization speed in the stage of the post polymerization to provide polyamide narrow in molecular weight distribution and excellent in various performance characteristics and moldability.

When the post polymerization is conducted by the solid-state polymerization, the polymerization is preferably conducted under reduced pressure or an inert gas atmosphere. In addition, the reaction temperature is controlled within a range of 180 to 280° C., whereby polymerization speed can be accelerated to achieve excellent productivity, and coloring of the resulting polymer and gelation can be effectively prevented.

When the post polymerization is conducted by means of the melt extruder, the reaction temperature is controlled to at most 370° C., whereby the resulting polyamide is scarcely decomposed to provide the component (B) free from deterioration.

As examples of the catalyst which may be used upon the preparation of the polyamide serving as the component (B), may be mentioned phosphoric acid, phosphorous acid and hypophosphorous acid; ammonium salts thereof; metal salts (salts with metals such as potassium, sodium, magnesium, vanadium, calcium, zinc, cobalt, manganese, tin, tungsten, germanium, titanium and antimony) thereof; and esters (ethyl esters, isopropyl esters, butyl esters, hexyl esters, isodecyl esters, octadecyl esters, decyl esters, stearyl esters and phenyl esters) thereof.

The polyamide serving as the component (B) preferably has an intrinsic viscosity [η] within a range of 0.4 to 3.0 dl/g, more preferably 0.6 to 2.0 dl/g, particularly preferably 0.8 to 1.6 dl/g as measured at 30° C. in concentrated sulfuric acid.

As examples of "other diamines than 1,9-nonanediamine and 2-methyl-1,8-octanediamine", which may be used for obtaining the component (B), may be mentioned the compounds exemplified as "other diamines than tetramethylenediamine", which may be used for obtaining the component (A). These diamines may be used either singly or in any combination thereof in combination with 1,9-nonanediamine and/or 2-methyl-1,8-octanediamine.

Among the diamines used for obtaining the component (B), the proportion of 1,9-nonanediamine and/or 2-methyl-1,8-octanediamine (total proportion in the case where both diamines are used) is generally at least 50% by mole, preferably 70 to 100% by mole, more preferably 100% by mole.

As examples of "other dicarboxylic acids than terephthalic acid", which may be used for obtaining the component (B), may be mentioned aliphatic dicarboxylic acids such as adipic acid, malonic acid, dimethylmalonic acid, succinic acid, 3,3-diethylsuccinic acid, glutaric acid, 2,2-dimethylglutaric acid, 2-methyladipic acid, trimethyladipic acid, pimelic acid, azelaic acid, sebacic acid and suberic acid; alicyclic dicarboxylic acids such as 1,3-cyclopentanedicarboxylic acid and 1,4-cyclohexane-dicarboxylic acid; and aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylene-dioxydiacetic acid, diphenic acid, 4,4'-oxydibenzoic acid, diphenylmethane-4,4'-dicarboxylic acid, diphenylsulfone-4,4'-dicarboxylic acid and 4,4'-biphenyl-dicarboxylic acid. These dicarboxylic acids may be used either singly or in any combination thereof in combination with terephthalic acid.

Among the dicarboxylic acids used for obtaining the component (B), the proportion of terephthalic acid is generally at least 50% by mole, preferably 70 to 100% by mole, more preferably 100% by mole.

At least one selected from ε-caprolactam, ω-laurolactam, ζ-enanthlactam, η-capryllactam, etc. may also be mixed into the reaction system for obtaining the component (B).

Terminal Capping Agent

Each of the components (A) and (B) constituting the thermoplastic resin composition according to the present invention may be capped at its at least one terminal group with a terminal capping agent.

No particular limitation is imposed on the terminal capping agent so far as it is a monofunctional compound having reactivity to the amino group or carboxyl group at the terminal of each polyamide. However, a monocarboxylic acid or a monoamine is preferred from the viewpoints of reactivity and stability to the capped terminal, with the monocarboxylic acid being more preferred from the viewpoint of easy handling. Besides, an acid anhydride such as phthalic anhydride, monoisocianate, monofunctional acid halide, monoester, monohydric alcohol or the like may also be used.

No particular limitation is imposed on the monocarboxylic acid used as the terminal capping agent so far as it has reactivity to an amino group. As examples thereof, however, may be mentioned aliphatic monocarboxylic acids such as acetic acid, propionic acid, butyric acid, valeric acid, capronic acid, caprylic acid, lauric acid, tridecylic acid, myristic acid, palmitic acid, stearic acid, pivalic acid and isobutyric acid; alicyclic monocarboxylic acids such as cyclohexanecarboxylic acid; and aromatic monocarboxylic acids such as benzoic acid, toluylic acid, α-naphthalenecarboxylic acid, β-naphthalenecarboxylic acid, methylnaphthalenecarboxylic acid and phenylacetic acid. These acids may be used either singly or in any combination thereof.

Among these, acetic acid, propionic acid, butyric acid, valeric acid, capronic acid, caprylic acid, lauric acid, tridecylic acid, myristic acid, palmitic acid, stearic acid and benzoic acid are particularly preferred from the viewpoints of reactivity, stability to a capped terminal, price and the like.

When terminals of polyamide are capped with a monocarboxylic acid, it is only necessary to slightly increase the number of moles of a diamine component used to a dicarboxylic acid component upon preparation of the polyamide in such a manner that both terminals of the resulting polyamide become amino groups, and add the monocarboxylic acid as a terminal capping agent.

No particular limitation is imposed on the monoamine used as the terminal capping agent so far as it has reactivity to a carboxyl group. As examples thereof, however, may be mentioned aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; and aromatic monoamines such as aniline, toluidine, diphenylamine and naphithylamine. These amines may be used either singly or in any combination thereof.

Among these, butylamine, hexylamine, octylamine, decylamine, stearylamine, cyclohexylamine and aniline are particularly preferred from the viewpoints of reactivity, boiling point, stability to a capped terminal, price and the like.

When terminals of polyamide are capped with a monoamine, it is only necessary to slightly decrease the number of moles of a diamine component used to a dicarboxylic acid component upon preparation of the polyamide in such a manner that both terminals of the resulting polyamide become carboxyl groups, and add the monoamine as a terminal capping agent.

Proportions of Component (A) and Component (B) Contained

Proportions of the components (A) and (B) contained in the thermoplastic resin composition according to the present invention are controlled to 5-95/95-5, preferably 10-90/90-10, more preferably 40-80/60-20, particularly preferably 55-80/45-20 in terms of "a weight ratio of the component (A) to the component (B)" or (component A/component B).

Any resin composition in which this ratio is lower than 5/95 is low in mechanical strength such as weld strength and tensile elongation and lacks good moldability and friction property On the other hand, any resin composition in which this ratio exceeds 95/5 lacks good anti-blister property Any resin composition in which this ratio falls within a range of 5/95 to 95/5 has high mechanical strength such as weld strength and tensile elongation, and excellent anti-blister property, moldability and friction property and moreover exhibits a marked improving effect on flexural strength (modulus in flexure).

Component (C)

As examples of the component (C) (flame retardant) constituting the thermoplastic resin composition according to the present invention, may be mentioned halogen-containing flame retardants such as bromine-containing flame retardants, chlorine-containing flame retardants, and phosphorus-containing flame retardants. These flame retardants may be used either singly or in any combination thereof. Among these, the halogen-containing flame retardants are preferred, with the bromine-containing flame retardants being particularly preferred.

As preferable examples of the bromine-containing flame retardants, may be mentioned brominated polystyrene, brominated poly(phenylene ether) and brominated epoxy oligomers. Brominated polystyrene is particularly preferred.

As examples of the brominated polystyrene constituting the component (C), may be mentioned compounds having a structure represented by the following general formula (1):

General formula (1)

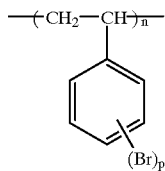

wherein p is an integer of 1 to 5, and n is an integer of 2 or greater.

The brominated polystyrene constituting the component (C) is prepared by a process of polymerizing brominated styrene or a process of brominating polystyrene. The brominated polystyrene obtained by the former process hereinafter may also be referred to as "poly(brominated styrene)", and the brominated polystyrene obtained by the latter process hereinafter may also be referred to as "post-brominated polystyrene".

The content of bromine in the brominated polystyrene is preferably 40 to 75% by weight, more preferably 50 to 75% by weight.

The brominated polystyrene may contain a structural unit derived from a monomer copolymerizable with brominated styrene or styrene as needed.

Examples of such a copolymerizable monomer include ethylene, propylene, butadiene, butene, hexene, pentene, methylbutene, methylpentene, styrene, acrylonitrile, vinyl chloride and vinyl acetate. Among these, ethylene, propylene, butadiene, styrene and acrylonitrile are preferred.

A functional group-containing vinyl monomer may also be used upon the preparation of the brominated polystyrene. Such a functional group-containing vinyl monomer may be used for copolymerization with brominated styrene or for modification of the terminals or the like of the brominated polystyrene.

As examples of the functional group in the functional group-containing vinyl monomer, may be mentioned a carboxyl group, an acid anhydride group, an oxazolyl group and an epoxy group.

Specific examples of the functional group-containing vinyl monomer include acrylic acid, methacrylic acid, maleic acid, maleic anhydride, itaconic anhydride, vinyloxazoline, glycidyl methacrylate and allyl glycidyl ether.

No particular limitation is imposed on the weight average molecular weight (Mw) of the brominated polystyrene constituting the component (C). However, it is preferably 5,000 to 500,000, more preferably 10,000 to 300,000.

The weight average molecular weight (Mw) can be determined as a weight average molecular weight in terms of polystyrene by means of gel permeation chromatography (GPC) in which said brominated polystyrene is dissolved at a concentration of 1 mg/ml in tetrahydrofuran (THF) as a solvent and measurement is conducted under conditions of a flow rate of 1.0 ml/min and a temperature of 36 to 40° C.

Specific examples of the brominated polystyrene constituting the component (C) are shown in the following Table 1.

TABLE 1

| | | Content of Bromine (wt %) | Average Molecular Weight (Mn) | Mw/Mn |
|---|---|---|---|---|
| C-1 | Poly (brominated styrene) (Polymer of dibromo-styrene) | 59 | 21,000 | 1.86 |
| C-2 | Poly (brominated styrene) (Copolymer of dibromostyrene: Tribromo-styrene = 2:8 (wt.)) | 68 | 30,000 | 2.13 |
| C-3 | Modified poly (brominated styrene) (Copolymer of maleic anhydride: dibromostyrene = 2: 98 (wt.)) | 60 | 52,000 | 1.92 |
| C-4 | Post-brominated polystyrene | 67 | 84,000 | 2.39 |
| C-5 | Post-brominated polystyrene | 58 | 32,000 | 6.12 |
| C-6 | Post-brominated polystyrene | 59 | 120,000 | 3.30 |

Among the brominated polystyrenes shown in Table 1, C-1, C-2 and C-3, which are poly(brominated styrenes) obtained by polymerizing brominated styrenes, are preferred. When the poly(brominated styrene) is used as the component (C), a far excellent effect (effect as to flame retardance) of the present invention is achieved.

The content of the component (C) in the thermoplastic resin composition according to the present invention is generally 5 to 70 parts by weight, preferably 10 to 60 parts by weight per 100 parts by weight of the specific polyamide resin component composed of the component (A) and the component (B).

If the content of the component (C) is lower than 5 parts by weight, flame resistance, which is an effect brought about by adding the flame retardant, cannot be fully imparted to the resulting resin composition. If the content of the component (C) exceeds 70 parts by weight on the other hand, the mechanical strength, friction property and anti-blister property of the resulting resin composition are lowered.

Component (D)

As examples of the component (D) (flame-retardant aid) constituting the thermoplastic resin composition according to the present invention, may be mentioned metallic compounds of Group Va in the periodic table and other metallic compounds.

Examples of the metallic compounds of Group Va in the periodic table include antimony compounds such as antimony trioxide, antimony pentoxide and sodium antimonate.

Examples of the other metallic compounds include boron oxide, zirconium oxide, iron oxide and zinc oxide. These metallic compound may be used either singly or in any combination thereof.

Among these, antimony compounds, which are metallic compounds of Group Va, are preferred, with antimony trioxide being particularly preferred.

The content of the component (D) in the thermoplastic resin composition according to the present invention is generally 0 to 50 parts by weight, preferably 1 to 30 parts by weight per 100 parts by weight of the specific polyamide resin component composed of the component (A) and the component (B). If the content of the component (D) exceeds 50 parts by weight, the mechanical strength of the resulting resin composition is lowered.

Component (E)

Examples of the component (E) (inorganic filler) constituting the thermoplastic resin composition according to the present invention include the conventionally known inorganic fillers, for example, various fillers of fibrous, powdery, particulate, plate, needle, cloth and mat forms.

Specific examples of the component (E) include glass fiber, asbestos fiber, carbon fiber, graphite fiber, calcium carbonate, talc, Catalpo, wollastonite, silica, alumina, silica-alumina, diatomaceous earth, clay, calcined clay, kaolin, mica (fine mica), particulate glass, glass flake, glass balloon (hollow glass), gypsum, red iron oxide, metallic fiber, titanium dioxide, synthetic and natural whiskers such as potassium titanate whisker and aluminum borate whisker, magnesium oxide, calcium silicate, asbestos, sodium aluminate, calcium aluminate, aluminum, aluminum oxide, aluminum hydroxide, copper, stainless steel, zinc oxide and metallic whiskers.

Among these, glass fiber, carbon fiber, kaolin, mica, talc and various kinds of whiskers are preferred in that they are excellent in the effect of improving mechanical strength, with glass fiber, kaolin and talc being particularly preferred from the economical viewpoint.

The inorganic filler used as the component (E) may be subjected to a surface treatment so far as no detrimental influence is thereby imposed on the moldability and physical properties of the thermoplastic resin composition according to the present invention. Especially, inorganic fillers subjected to treatment with a surface treatment agent such as aminosilane or acrylsilane, or with a film former such as urethane-, acryl- or acrylurethane-compound, etc. may be preferably used.

The content of the component (E) in the thermoplastic resin composition according to the present invention is generally 50 to 300 parts by weight, preferably 5 to 200 parts by weight, more preferably 5 to 150 parts by weight per 100 parts by weight of the specific polyamide resin component composed of the component (A) and the component (B).

If the content of the component (E) is lower than 5 parts by weight, an effect of improving stiffness and dimension stability, which is an effect brought about by adding the filler, cannot be fully imparted to the resulting resin composition. If the content of the component (E) exceeds 300 parts by weight on the other hand, the weld strength of the resulting resin composition is lowered, and moreover the molding and processing ability of the resin composition is deteriorated.

Other Components

Other optional components than the components (A) to (E) may be added to the thermoplastic resin composition according to the present invention according to required properties and the like so far as no detrimental influence is thereby imposed on the moldability and physical properties thereof.

As examples of such optional components, may be mentioned pigments, dyes, ultraviolet absorbents, weathering agents, lubricants, nucleating agents, releasing agents, plasticizers, antistatic agents, hydrophobic zeolite, hydrotalcite and zinc borate.

Antioxidants or heat stabilizers, such as copper compounds such as copper iodide, aromatic amine compounds, hindered phenol compounds, organophoshorus compounds, and sulfur compounds may be added to the thermoplastic resin composition according to the present invention with a view toward improving the heat resistance thereof.

To the thermoplastic resin composition according to the present invention, may be added, as another resin component than the specific polyamide resin component, thermoplastic resins such as PPS, LCP, PPE, polyamide 6, T resins, syndiotactic polystyrene, PET, PBT, polyamide 6, polyamide 66, polyamide 11, polyamide 12, ABS resins, HIPS, AS resins, PS, PTFE, polyvinylidene fluoride, aramide fiber, polyethylene and polypropylene. These thermoplastic resins may be modified by a functional group such as a carboxyl group, acid anhydride group, epoxy group, hydroxyl group, oxazolyl group, amino group or amide group.

As a rubber or elastomer component, may also be added maleic anhydride-modified ethylene-propylene copolymers, hydrogenated butadiene rubber, hydrogenated styrene-butadiene block copolymers, polyester elastomers, polyamide elastomers and/or the like.

Preparation Process

The thermoplastic resin composition according to the present invention can be prepared by melting and kneading the components (A) and (B), and the optionally added components (C) to (E) and other components by means of a kneader.

As examples of the kneader used for preparing the thermoplastic resin composition according to the present invention, may be mentioned extruders, kneaders, rolls, a Brabender, a Banbury mixer and continuous kneaders. These may be used in combination with each other. Among these, the extruders are preferred, with twin-screw extruders being particularly preferred.

As examples of a method for charging the constitutive components of the thermoplastic resin composition according to the present invention into the kneader to knead them, may be mentioned (i) a method in which all the components are charged at once to knead them, (ii) a method in which a part of the components are charged at once or in portions to knead them, and the residual components are then charged at once or in portions to knead them, and (iii) a method in which a part of all the components are charged at once or in portions to knead them, and the residual part of all the components are then charged at once or in portions to knead them.

Molding or Forming Method

The thermoplastic resin compositions according to the present invention can be molded or formed by any molding or forming methods, for example, injection molding, compression molding, vacuum forming, sheet forming, film forming, injection press molding, blow molding, profile extrusion, two-color molding, thermoeject molding, insert molding, outsert molding, etc.

Use Application

The thermoplastic resin compositions according to the present invention can be used in a wide variety of fields such as electrics and electronics, vehicles, appliances, buildings, sanitary, sports, and sundries owing to their excellent performance. Specific examples thereof include connectors, switches, sensors, sockets, capacitors, jacks, fuse holders, relays, coil bobbins, resistors, housings for IC and LED, gears, bearing retainers, spring holders, chain tensioners, washers, worm wheels, belts, filters, various kinds of housings, autotensioners and wait rollers, breaker parts, and clutch parts. Among these, the thermoplastic resin compositions according to the present invention are particularly useful for connectors, switches, sensors, resistors, relays, capacitors, sockets, jacks, fuse holders, coil bobbins and housings for IC and LED, to which the surface-mount technology system is applied.

EXAMPLES

The present invention will hereinafter be described in more detail by the following examples and comparative examples. However, the present invention is not limited to these examples.

All designations of "%" and "part" or "parts" as will be used in these examples and comparative examples mean "% by weight" and "part or parts by weight" unless expressly noted.

Preparation Example A1

A polyamide 4,6 resin obtained by polycondensing 1,4-tetramethylenediamine with adipic acid was provided as Component (A). This resin was regarded as "Component (A-1)".

Component (A-1) had a relative viscosity of 2.5 as measured at a polymer concentration of 1 g/dl (25° C.) in 96% sulfuric acid and a crystal melting temperature (a temperature corresponding to a peak upon melting of crystals by DSC measurement; the same shall apply hereinafter) of 300° C.

Preparation Example A2

A polyamide 4,6 resin having a different of degree polymerization from Component (A-1) was provided as Component (A). This resin was regarded as "Component (A-2)".

Component (A-2) had a relative viscosity of 3.5 as measured at a polymer concentration of 1 g/dl (25° C.) in 96% sulfuric acid and a crystal melting temperature of 300° C.

Preparation Example A3

A polyamide 4,6 resin having a different degree of polymerization from Component (A-1) and Component (A-2) was provided as Component (A). This resin was regarded as "Component (A-3)".

Component (A-3) had a relative viscosity of 4.5 as measured at a polymer concentration of 1 g/dl (25° C.) in 96% sulfuric acid and a crystal melting temperature of 300° C.

Preparation Example B1

A polyamide 9, T resin obtained by polycondensing 1,9-nonanediamine with terephthalic acid and benzoic acid (terminal capping agent) was provided as Component (B). This resin was regarded as "Component (B-1)".

Component (B-1) had an intrinsic viscosity [η] of 1.15 as measured at 30° C. in concentrated sulfuric acid and a crystal melting temperature of 315° C.

Preparation Example B2

A polyamide resin obtained by polycondensing a diamine component composed of 85% by mole of 1,9-nonanediamine and 15% by mole of 2-methyl-1,8-octanediamine with terephthalic acid and benzoic acid (terminal capping agent) was provided as Component (B). This resin was regarded as "Component (B-2)".

Component (B-2) had an intrinsic viscosity [η] of 1.15 as measured at 30° C. in concentrated sulfuric acid and a crystal melting temperature of 306° C.

Preparation Example C1

Poly(brominated styrene), "PDBS-80" (product of Great Lakes Chemical Co.; bromine content: 59%, Mn=2,100, Mw/Mn=1.86) was provided as Component (C) (flame retardant).

Preparation Example D1

Antimony trioxide was provided as Component (D) (flame-retardant aid).

Preparation Example E1

Glass fiber-chopped strand having a fiber diameter of 10 μm and a cut length of 3 mm and subjected to a surface treatment (surface treating agent: aminosilane, greige goods: urethane) was provided as Component (E).

Examples 1 to 6, and Comparative Examples 1 and 2

After Components (A), (B), (C) and (D) were uniformly mixed by means of a tumbler in accordance with their corresponding formulations shown in the following Table 3, each of the mixtures was fed to a twin-screw extruder (screw diameter: 44 mm) having a feed opening in the middle thereof, from the proximal part thereof, and Component (E) was fed from the feed opening provided in the middle thereof to melt and knead the respective components while venting under reduced pressure, thereby forming pellets.

The pellets thus obtained were fully dried by a dehumidifying dryer and molded into prescribed specimens (specimens for performance evaluation) by means of an injection molding machine.

Example 7, and Comparative Examples 3 and 4

After Components (A) and (B) were uniformly mixed by means of a tumbler in accordance with their corresponding formulations shown in the following Table 3, each of the mixtures was fed to the twin-screw extruder (screw diameter: 44 mm) from the proximal part thereof, the respective components were melt and knead while venting under reduced pressure, thereby forming pellets.

The pellets thus obtained were fully dried by a dehumidifying dryer and molded into prescribed specimens (specimens for performance evaluation) by means of an injection molding machine.

Evaluation of Resin Composition

With respect to each of the resin compositions according to the present invention obtained in Examples 1 to 7 and the resin compositions for comparison obtained in Comparative Examples 1 to 4, the mechanical strength (modulus in flexure, weld strength and tensile elongation) was measured, and anti-blister property, moldability and friction property were evaluated. The results are shown collectively in Table 3.

Incidentally, the measurement and evaluation were conducted in accordance with the following respective methods:

(1) Modulus in Flexure

Measured in accordance with ASTM D 790.

(2) Weld Strength

A molding a (two gates at both ends) in the form of a bar of a wall thickness of 0.8 mm, having a welded part at the central portion thereof and a molding b (one gate at an end) in the form of a bar of a wall thickness of 0.8 mm having no welded part were produced.

With respect to each of the moldings a and b thus obtained, an indenter was applied to the central part (the welded part in the molding a) thereof to measure flexural strength, and a retention (%) was calculated out from the following equation to regard it as the weld strength.

Retention (%)=(Flexural strength of Molding a/Flexural strength of Molding b)×100

(3) Tensile Elongation

Measured in accordance with ASTM D 638.

(4) Anti-blister Property (i) Specimen:

A flat plate having a thickness of 0.8 mm was obtained by means of an injection molding machine and then left to stand for 48 hours under an environment of a temperature of 35° C. and a relative humidity of 90% to cause the flat plate to absorb water (moisture), thereby providing a specimen.

(ii) Conditions for reflow test:

"Air Reflow AIS-260" (manufactured by Eitec Techtron Co.) was used as a reflowing apparatus.

The temperature of the reflowing apparatus was preset as shown in the following Table 2. In Table 2, "PH1", "PH2" and "PH3" mean preset temperatures in reflow preheating zones, and "RE" means a preset temperature in a reflowing zone.

TABLE 2

|  | Reflow Preheating Temperature (° C.) | | | Reflow Temperature (° C.) |
| --- | --- | --- | --- | --- |
|  | PH1 | PH2 | PH3 | RE |
| Condition 1 | 200 | 180 | 190 | 280 |

(iii) Evaluation:

The number of blisters occurred in the specimen was counted.

(5) Moldability:

"Arblug 270-90-350D" was used as an injection molding machine to charge each thermoplastic resin composition sample into a cavity (0.67 mm×12.7 mm×127 mm) of a mold, thereby ranking the moldability of the sample as "A" where the sample was surely charged, or "B" where the sample was insufficiently charged. The cylinder temperature and injection pressure of the injection molding machine were preset to 315° C. and 65%, respectively, and the mold temperature was preset to 120° C.

(6) Friction property:

"Suzuki type fractional wear tester" was used, and carbon steel (S45C) was provided as the fellow material to conduct a sliding test under conditions of a surface pressure of 0.1 MPa, a speed of 50 cm/sec and a travel distance of 20 km to measure a specific abrasion loss (mm$^3$/N.km) of a test sample.

TABLE 3

| | Combination Rate (part by weight) | | | | | | |
| --- | --- | --- | --- | --- | --- | --- | --- |
| | Component (A) | | Component (B) | | Component (C) | Component (D) | Component (E) |
| | Type | Weight | Type | Weight | | | |
| Example | | | | | | | |
| 1 | A-2 | 60 | B-1 | 40 | 47 | 14 | 72 |
| 2 | A-2 | 50 | B-1 | 50 | 47 | 14 | 72 |
| 3 | A-2 | 70 | B-1 | 30 | 47 | 14 | 72 |
| 4 | A-2 | 60 | B-2 | 40 | 47 | 14 | 72 |
| 5 | A-1 | 60 | B-1 | 40 | 47 | 14 | 72 |
| 6 | A-3 | 60 | B-1 | 40 | 47 | 14 | 72 |
| 7 | A-2 | 60 | B-1 | 40 | — | — | — |
| Comparative Example | | | | | | | |
| 1 | A-2 | 99 | B-1 | 1 | 47 | 14 | 72 |
| 2 | A-2 | 1 | B-1 | 99 | 47 | 14 | 72 |
| 3 | A-2 | 99 | B-1 | 1 | — | — | — |
| 4 | A-2 | 1 | B-1 | 99 | — | — | — |

| | Evaluation Result | | | | | |
| --- | --- | --- | --- | --- | --- | --- |
| | Mechanical Strength | | | | | |
| | Modulus in Flexure [MPa] | Weld Strength [%] | Tensile Elongation [%] | Blister Resistance [pieces] | Moldability | Friction Property mm$^3$/N · km |
| Example | | | | | | |
| 1 | 13,200 | 85 | 2.8 | 0 | A | 15 × 10$^{-3}$ |
| 2 | 13,300 | 80 | 2.8 | 0 | A | 15 × 10$^{-3}$ |
| 3 | 13,100 | 85 | 2.8 | 0 | A | 15 × 10$^{-3}$ |
| 4 | 12,800 | 85 | 2.9 | 0 | A | 16 × 10$^{-3}$ |
| 5 | 13,200 | 85 | 2.8 | 0 | A | 15 × 10$^{-3}$ |
| 6 | 13,200 | 85 | 2.8 | 0 | A | 15 × 10$^{-3}$ |
| 7 | 3,300 | 92 | 30 | 0 | A | 5 × 10$^{-3}$ |
| Comparative Example | | | | | | |

TABLE 3-continued

| 1 | 12,000 | 85 | 2.8 | 10 | A | $15 \times 10^{-3}$ |
|---|--------|----|-----|----|---|---------------------|
| 2 | 12,700 | 45 | 1.2 | 0  | B | $37 \times 10^{-3}$ |
| 3 | 3,100  | 92 | 30  | 5  | A | $5 \times 10^{-3}$  |
| 4 | 3,200  | 60 | 14  | 0  | B | $10 \times 10^{-3}$ |

From the results shown in Table 3, the following facts are understood.

(1) Examples 1 to 6, and Comparative Examples 1 and 2

The resin compositions according to Examples 1 to 6 contained the specific polyamide resin component composed of the component (A) and the component (B) blended with each other in specific ranges and are hence high is mechanical strength (modulus in flexure, weld strength and tensile elongation) and excellent in anti-blister property, moldability and friction property To the contrary, the resin composition according to Comparative Example 1 is low in modulus in flexure and poor in anti-blister property because the content of the component (A) is too high, and the content of the component (B) is too low.

Further, the resin composition according to Comparative Example 2 is low in mechanical strength and poor in moldability and friction property because the content of the component (A) is too low, and the content of the component (B) is too high.

(2) Example 7, and Comparative Examples 3 and 4

The resin composition according to Example 7 was composed of the specific polyamide resin composed of the component (A) and the component (B) blended with each other in specific ranges and are hence high is mechanical strength (modulus in flexure, weld strength and tensile elongation) and excellent in anti-blister property moldability and friction property.

To the contrary, the resin composition according to Comparative Example 3 is low in modulus in flexure and poor in anti-blister property because the content of the component (A) is too high, and the content of the component (B) is too low.

Further, the resin composition according to Comparative Example 4 is low in mechanical strength and poor in moldability and friction property because the content of the component (A) is too low, and the content of the component (B) is too high.

Effect of the Invention

As described above, the thermoplastic resin compositions according to the present invention have excellent anti-blister property, and do not cause blister on the surfaces of resinous parts molded therefrom by passing through a reflowing oven when the resin composition is used as a resin material forming the resinous parts subjected to the surface-mount technology system.

Further, the thermoplastic resin compositions according to the present invention are high in mechanical strength such as flexural strength, weld strength and tensile elongation and excellent in moldability and friction property.

What is claimed is:

1. A thermoplastic resin composition, comprising:
a polyamide resin component comprising (A) 5 to 95% by weight of a polyaniide resin obtained by polycondensing diamine(s) including at least tetraniethylenedianiine with dicarboxylic acid(s) including at least adipic acid, based on a total amount of (A) and (B); and (B) 95 to 5% by weight of a polyamide resin obtained by polycondensing diamine(s) including at least one of 1,9-nonanedianiine and 2-methyl- 1,8-octanedianune with dicarboxylic acid(s) including at least terephthalic acid, based on a total amount of (A) and (B).

2. The thermoplastic resin composition according to claim 1, wherein the polyamide resin component comprises 55 to 80% by weight of the component (A) and 45 to 20% by weight of the component (B).

3. The thermoplastic resin composition according to claim 1 or 2, wherein the component (B) comprises a polyamide resin obtained from 1,9-nonanediamine and/or 2-methyl-1,8-octanediamine and terephthalic acid.

4. The thermoplastic resin composition according to claim 1 or 2, which comprises, per 100 parts by weight of the polyamide resin component, 5 to 70 parts by weight of (C) a flame retardant and 0 to 50 parts by weight of (D) a flame-retardant aid.

5. The thermoplastic resin composition according to cliam 1 or 2, which comprises, per 100 parts by weight of the polyamide resin component, 5 to 300 parts by weight of (E) an inorganic filler.

6. The thermoplastic resin composition according to claim 1 or 2, wherein the component (A) comprises a polyamide 4,6 resin obtained from tetramethylenediamine and adipic acid.

7. The thermoplastic resin composition according to claim 1, wherein component (A) has a relative viscosity of 2.0 to 6.0 at a polymer concentration of 1 g/dl in 96% sulfuric acid at 25°C.

8. The thermoplastic resin composition according to claim 1, wherein said diamine of component (A) is selected from the group consisting of hexamethylenediamine, undecamethylenediamine, dodecamethylenediamine, 2,2,4-trimethylhexamethylenediamine, 2,4,4-trimethyl-hexamethylenediamine, 5-methylnonamethylenediamine, m-xylylenediamine, p-xylylenediaiine, 1,3-bis(aminomethyl)-cyclohexane, 1-amino-3-aminomethyl-3,5,5-trimethylcyclo-hexane, bis(3-methyl-4-aminocyclohexyl)methane, 2,2-bis(4-aminocyclohexyl)propane, 2,2-bis(aminopropyl)piperazine, aminoethylpiperazine, ethylenediamine, propylenediamine, 1,8-octanediamine and mixtures thereof.

9. The thermoplastic resin composition according to claim 1, wherein an amount of said tetramethylenediamine is at least 50% by mole based on a total amount of said diamine(s) of comoonent (A).

10. The thermoplastic resin composition according to claim 1, wherein said dicarboxylic acid for component (A) is selected from the group consisting of aliphatic dicarboxylic acids, alicyclic dicarboxylic acids and aromatic dicarboxylic acids.

11. The thermoplastic resin composition according to claim 1, wherein an amount of said adipic acid is at least 50% by mole based on a total amount of said dicarboxylic acid(s) of component (A).

12. The thermoplastic resin composition according to claim 1, wherein said component (A) comprises a unit derived from a polycarboxylic acid having at least 3 functional groups.

13. The thermoplastic resin composition according to claim 1, wherein said component (B) has an intrinsic viscosity of 0.4 to 3.0 dl/g as measured at 30°C. in concentrated sulfuric acid.

14. The thermoplastic resin composition according to claim 1, wherein said diamine other than 1,9-nonanediamine and 2-methyl-1,8-octanediamine of component (B) is selected from the group consisting of hexamethylenediamine, undecaxnethylenediamine, dodecamethylenediamine, 2,2,4-trimethyihexamethylenediamine, 2,4,4-trimethyl-hexamethylenediamine, 5-methylnonamethylenedianilne, m-xylylenediamine, p-xylylenediamine, 1,3-bis (aminomethyl)-cyclohexane, 1-amino-3-aminomethyl-3,5, 5-trimethylcyclo-hexane, bis(3-methyl-4-aminocyclohexyl) methane, 2,2-bis(4-aminocyclohexyl)propane, 2,2-bis (aminopropyl)piperaziie, aminoethylpiperazine, ethylenediamine, propylenediamilie, 1,8-octanediamine and mixtures thereof.

15. The thermoplastic resin composition according to claim 1, wherein said 1,9-nonanediarnine and/or said 2-methyl-1,8-octanediamifle of component (B) are present in an amount of at least 50 mole % based on a total amount of said diamine(s) of component (B).

16. The thermoplastic resin composition according to claim 1, wherein said terephthalic acid is present in an amount of at least 50 mole % based on a total amount of said dicarboxylic acid(s) of component (B).

17. The thermoplastic resin composition according to claim 1, wherein said component (B) further comprises at least one unit derived from a member selected from the group consisting of $\epsilon$-caprolactam, $\omega$-laurolactam, $\zeta$-enanthlactam and $\eta$-capryllactam.

18. The thermoplastic resin composition according to claim 1, wherein at least one of components (A) and (B) is capped at at least one terminal group with a terminal capping agent which is a monofunctional compound having reactivity to an amino group or a carboxyl group at a terminal of components (A) and/or (B).

19. A molded part obtained by molding a thermoplastic resin composition according to claim 1.

20. An electric or electronic part comprising a thermoplastic resin composition according to claim 1.

* * * * *